A. C. SMITH & F. E. HENRY.
LOCKING LEVER.
APPLICATION FILED FEB. 19, 1915.

1,168,973.

Patented Jan. 18, 1916.

Inventors
Alfred C. Smith
Frederick E. Henry
By Victor J. Evans
Attorney

UNITED STATES PATENT OFFICE.

ALFRED C. SMITH AND FREDERICK E. HENRY, OF DOBBS FERRY, NEW YORK.

LOCKING-LEVER.

1,168,973.   Specification of Letters Patent.   Patented Jan. 18, 1916.

Application filed February 19, 1915. Serial No. 9,462.

*To all whom it may concern:*

Be it known that we, ALFRED C. SMITH and FREDERICK E. HENRY, citizens of the United States, residing at Dobbs Ferry, in the county of Westchester and State of New York, have invented new and useful Improvements in Locking-Levers, of which the following is a specification.

This invention relates to means for locking a lever upon a rack bar whereby said rack bar cannot be operated except by an authorized person, and the object of the invention is to provide a device of this character which is of a simple construction, cheap to manufacture, durable and which will perform its function with expediency and accuracy.

With the above and other objects in view, the improvement resides in the construction, combination and arrangement of parts set forth in the following specification and falling within the scope of the appended claims.

Figure 1:
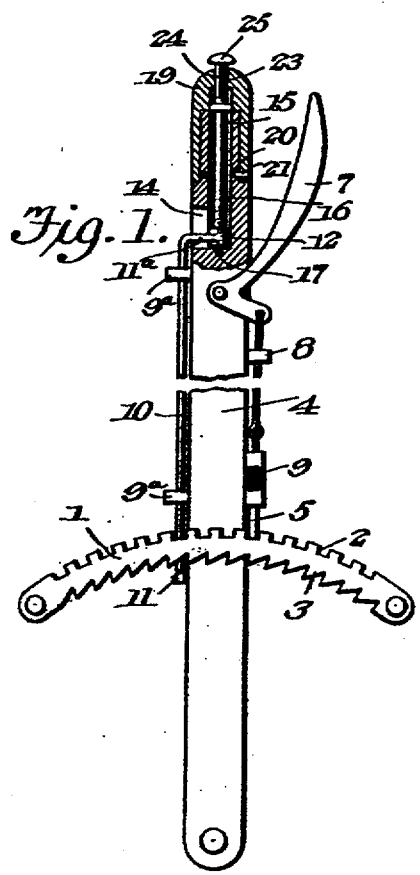
Figure 2:
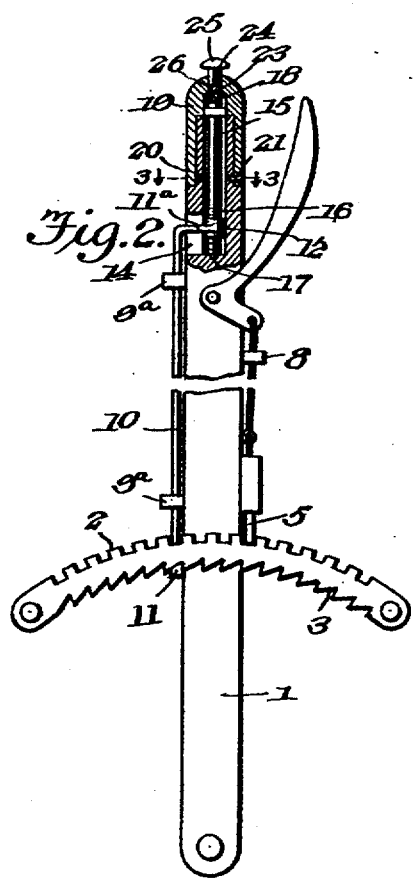
Figure 4:
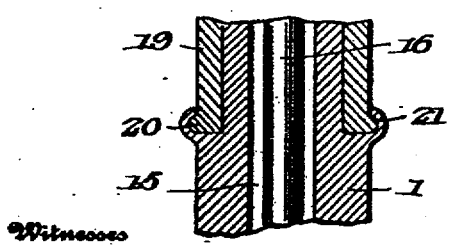
Figure 3:
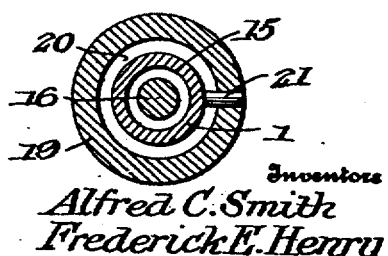

In the drawing: Figure 1 is a side elevation of a device constructed in accordance with the present invention, the locking dog being shown out of engaging position with the rack bar, Fig. 2 is a similar view partly in section, illustrating the lever locked upon the rack bar, Fig. 3 is a transverse sectional view approximately on the line 3—3 of Fig. 2, and Fig. 4 is a sectional view of the upper portion of the lever illustrating a modification.

Referring now to the drawing in detail, the numeral 1 designates a rack bar, which in the present instance, is in the form of a segment and which has its opposite edges provided with teeth 2 and 3. Pivoted for operation over the segmental rack bar 1 is a lever 4, the said lever being connected with a throw rod (not shown) for actuating certain mechanism (also not shown). If desired, and preferably, the lever is provided with a spring actuated dog 5, the same being connected with a spring pressed rod 6 and being provided with an operating handle 7. The dog 5 is adapted to engage with the outer teeth 2 of the segmental rack bar 1, so that the lever may be swung upon the rack bar and be locked by the said dog to any desired position with relation to the rack bar. The rod 6 passes through suitable bearings 8 and the numeral 9 designates a spring therefor. The opposite edge of the lever 4 is provided with bearings 9ª through which passes a rod 10, the said rod being provided with a dog 11 which is adapted to engage with the lower teeth 3 of the segmental rack bar 1. The rod 10 is formed, at its upper or outer end, with an angular extension 11ª, the said extension being provided with a head 12 having a bore provided with interior threads. The angular member 11ª passes through an elongated opening 14 provided in the lever 4 at the upper or outer end thereof and the said lever is centrally formed with a longitudinally extending recess or channel 15 to receive the screw member 16. The screw is mounted in suitable bearings 17 arranged within the channel 15 and the upper end of said screw above its outer bearing is formed with a square or non-circular portion 18. The end of the lever provided with the channel 15 is reduced to receive the annular bore of a handle 19. This handle may be secured to the lever 4 by providing the same with an annular slot 20 through which passes a pin 21, the said pin engaging with the reduced portion at the end of the lever, or, and as illustrated in Fig. 3 of the drawing, the said handle 19 will be formed upon its lower edge with a rib 20 which is engaged by a flanged sleeve or collar 21' provided upon the end of the lever 4. The upper and outer end of the handle 19 is formed with a non-circular or square opening 23, and the said opening is adapted to receive the rectangular or square shank 24 of a headed pin 25. The shank 24 of the pin 25 is provided with a rectangular opening 26 which is adapted to engage with the rectangular or squared end 18 of a screw 16. By passing the key through the opening 23 and permitting the same to engage with the screw 16, it will be noted that by rotating the handle 19 the rod 10, through the medium of its interiorly threaded head 12, engaging with a screw 16, will be moved either toward or away from the inner series of teeth 3 of the rack bar 1, so bringing the dog 11 into engagement between the said teeth 3 or out of engagement with the said teeth. It will be further noted that when the key 25 is withdrawn the handle may be rotated without influencing the rod 10, so that only authorized persons or persons possessing the key may operate the lever after the dog of the same has been locked upon the segmental rod.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what we claim as new is:

1. In a device for the purpose set forth, a rack bar, a pivoted lever for the rack bar, said lever having its outer end provided with a channel, a screw journaled in bearings in the channel, said screw having its outer end provided with a square or rectangular portion, a handle upon the lever and rotatable thereon, said handle having its outer end provided with a central opening, a key adapted to engage with the walls of the said opening and to also engage with the end of the screw, a dog for co-acting with the teeth of the rack bar, a rod upon the dog, said rod having an angular portion passing through an elongated slot in the lever and having a head provided with a bore engaging the screw, substantially as and for the purpose set forth.

2. A device of the class described, the combination of a double rack segment, of a lever pivoted for operation over the segment and having a main operated locking dog associated therewith and arranged to engage one face of the segment, an auxiliary locking dog arranged to engage the opposite face of the segment, a screw journaled in the lever, an operative connection between the screw and the auxiliary locking dog, a rotatable handle on the lever and a key removably connected with the handle and adapted to have operative connection with the screw, whereby the auxiliary locking dog may be positively operated in either direction.

3. A device of the class described, the combination with a rack segment, a lever pivoted for operation over said segment, a shiftable dog carried by the lever for engagement with said segment, and means for operating said dog in both directions, said means comprising a screw journaled in the lever, a rotatable handle on the lever, and a removable connection between the handle and screw.

In testimony whereof we affix our signatures in presence of two witnesses.

ALFRED C. SMITH.
FREDERICK E. HENRY.

Witnesses:
MICHAEL A. CASHEN,
WARREN C. KING.

Copies of this patent may be obtained for five cents each, by addressing the "Commissioner of Patents, Washington, D. C."